United States Patent
Lydle

(10) Patent No.: US 11,377,313 B2
(45) Date of Patent: Jul. 5, 2022

(54) SHIPPING CONTAINER HANDLING SYSTEMS AND METHODS

(71) Applicant: THE RICHARD C. LYDLE REVOCABLE TRUST, Lighthouse Point, FL (US)

(72) Inventor: Richard C. Lydle, Lighthouse Pointe, FL (US)

(73) Assignee: THE RICHARD C. LYDLE REVOCABLE TRUST, Lighthouse Pointe, FL (US)

(*) Notice: Subject to any disclaimer, the term of this patent is extended or adjusted under 35 U.S.C. 154(b) by 0 days.

(21) Appl. No.: 16/622,517

(22) PCT Filed: Jun. 14, 2017

(86) PCT No.: PCT/US2017/037488
§ 371 (c)(1),
(2) Date: Dec. 13, 2019

(87) PCT Pub. No.: WO2018/231222
PCT Pub. Date: Dec. 20, 2018

(65) Prior Publication Data
US 2020/0207557 A1    Jul. 2, 2020

(51) Int. Cl.
| | |
|---|---|
| B65G 63/00 | (2006.01) |
| B65G 67/60 | (2006.01) |
| B66F 9/06 | (2006.01) |
| B66C 19/00 | (2006.01) |

(52) U.S. Cl.
CPC ......... *B65G 63/004* (2013.01); *B65G 67/603* (2013.01); *B66F 9/06* (2013.01); *B65G 2201/0235* (2013.01); *B66C 19/002* (2013.01)

(58) Field of Classification Search
CPC .. B65G 63/004; B65G 63/065; B65G 63/002; B65G 63/006; B65G 67/603; B65G 2201/0235; B65G 1/0407; B66F 9/06
See application file for complete search history.

(56) References Cited

U.S. PATENT DOCUMENTS

| | | | | |
|---|---|---|---|---|
| 3,559,822 | A | * | 2/1971 | Lichtenford .......... B66C 19/002 414/140.3 |
| 3,754,669 | A | * | 8/1973 | Alsen ................... B65G 63/004 414/140.8 |
| 4,023,687 | A | | 5/1977 | Salloum |
| 5,310,066 | A | | 5/1994 | Konstant |

(Continued)

FOREIGN PATENT DOCUMENTS

WO    2012123956    9/2012

OTHER PUBLICATIONS

United States Patent and Trademark Office, International Search Report/Written Opinion, International Application No. PCT/US17/37488, dated Sep. 7, 2017, 16 pages, Alexandria, VA U.S.A.

*Primary Examiner* — Kaitlin S Joerger
(74) *Attorney, Agent, or Firm* — Hahn Loeser + Parks LLP; Scott M. Oldham

(57) ABSTRACT

There is provided shipping container handling systems and methods that maximize the number of containers that can be stored on a predetermined property, as well as increasing the efficiency of the transfer of containers between transshipment vehicles, such as cargo ships/barges, trucks, airline, rail systems and the like.

21 Claims, 10 Drawing Sheets

(56) References Cited

U.S. PATENT DOCUMENTS

| | | | |
|---|---|---|---|
| 5,618,148 A * | 4/1997 | Iversen | B63B 25/004 |
| | | | 414/139.9 |
| 6,768,421 B1 | 7/2004 | Alioto et al. | |
| 8,596,946 B2 * | 12/2013 | Lydle | B63C 3/12 |
| | | | 414/277 |
| 8,997,407 B2 * | 4/2015 | Khoon | B65G 63/004 |
| | | | 52/79.1 |
| 9,321,591 B2 | 4/2016 | Lert et al. | |
| 9,862,557 B2 * | 1/2018 | Kasai | B65G 63/004 |
| 10,155,633 B2 | 12/2018 | Heide et al. | |
| 10,636,107 B2 * | 4/2020 | Ryu | B65G 63/004 |
| 10,745,092 B2 * | 8/2020 | Lydle | B63C 3/06 |
| 10,752,440 B2 * | 8/2020 | Lindbo | A01G 7/045 |
| 2003/0047529 A1 * | 3/2003 | Dobner | B65G 63/004 |
| | | | 212/232 |
| 2006/0045659 A1 * | 3/2006 | Hubbard | B65G 63/045 |
| | | | 414/139.4 |
| 2006/0045660 A1 * | 3/2006 | Di Rosa | B65G 63/004 |
| | | | 414/139.9 |
| 2010/0189534 A1 * | 7/2010 | Jung | B65G 63/004 |
| | | | 414/281 |
| 2010/0192486 A1 | 8/2010 | Khoon | |
| 2010/0322748 A1 * | 12/2010 | Lee | B65G 1/0407 |
| | | | 414/281 |
| 2012/0219397 A1 | 8/2012 | Baker | |
| 2013/0343843 A1 * | 12/2013 | Venkataraman | B65G 1/04 |
| | | | 414/277 |
| 2016/0122139 A1 * | 5/2016 | Pedersen | A47F 7/28 |
| | | | 414/139.4 |
| 2016/0332847 A1 * | 11/2016 | Hegewald | B65G 63/004 |
| 2018/0127208 A1 * | 5/2018 | Preidt | B65G 1/0435 |
| 2019/0135539 A1 | 5/2019 | Heide et al. | |
| 2020/0047997 A1 * | 2/2020 | Van Staalduinen | B65G 1/0478 |
| 2020/0307924 A1 * | 10/2020 | Wieschemann | G06Q 10/00 |

* cited by examiner

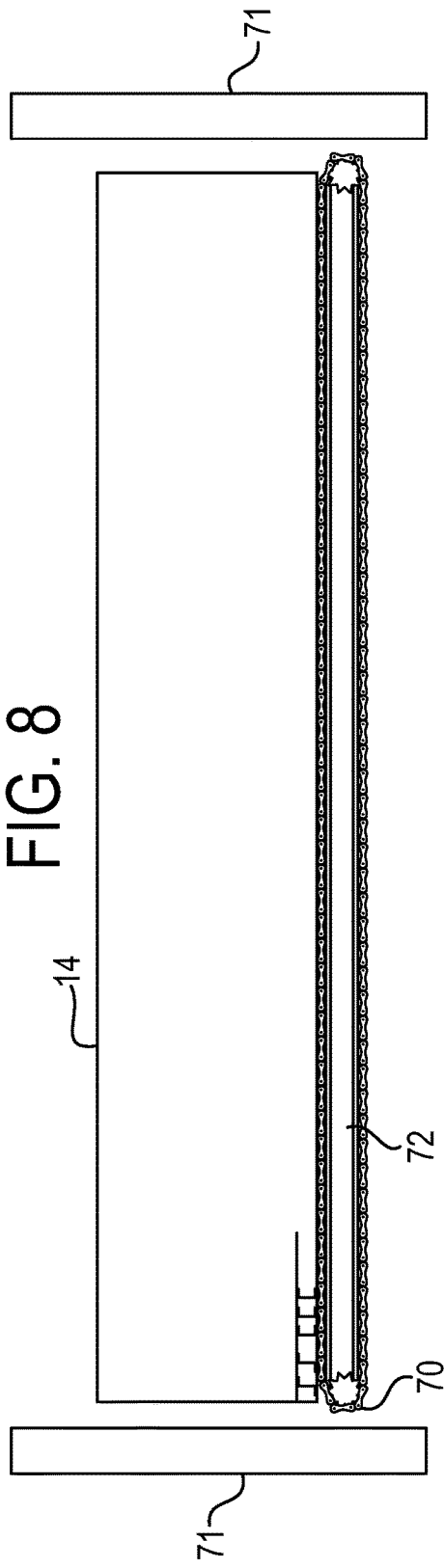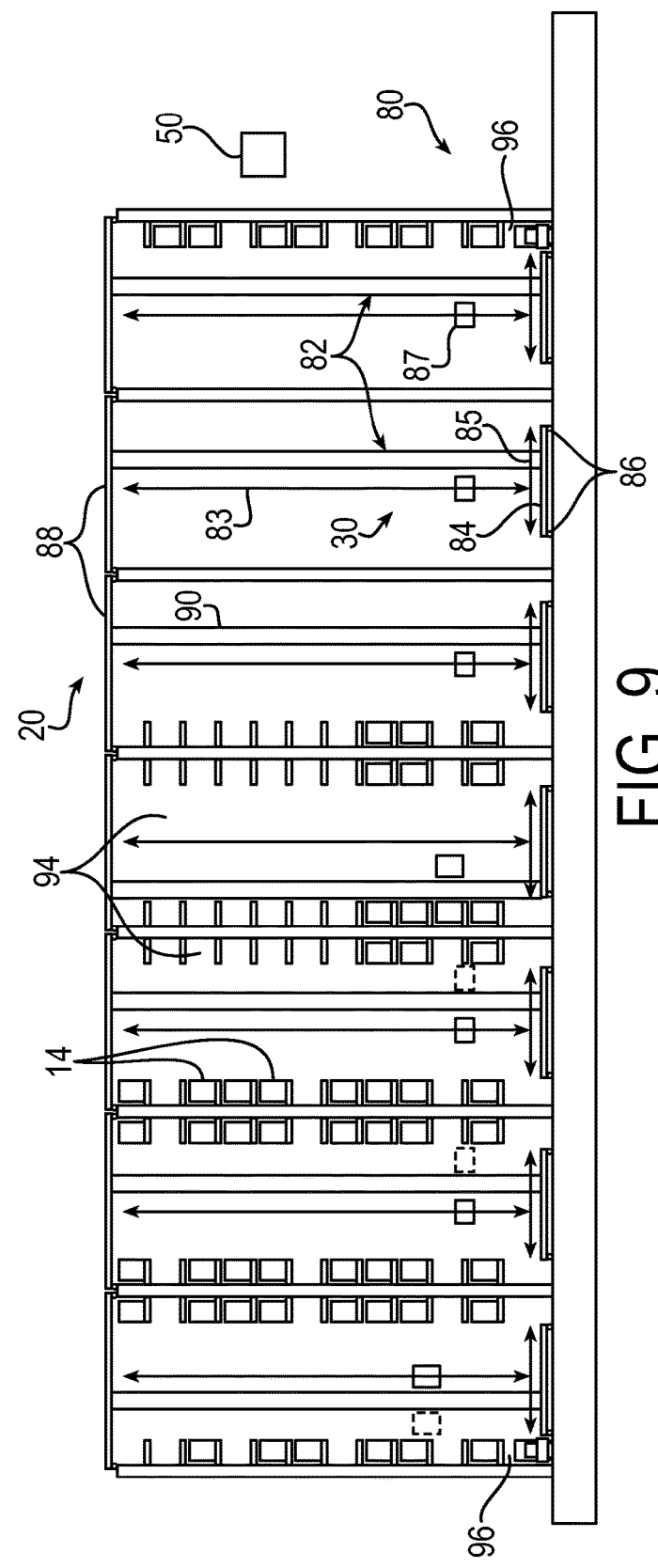

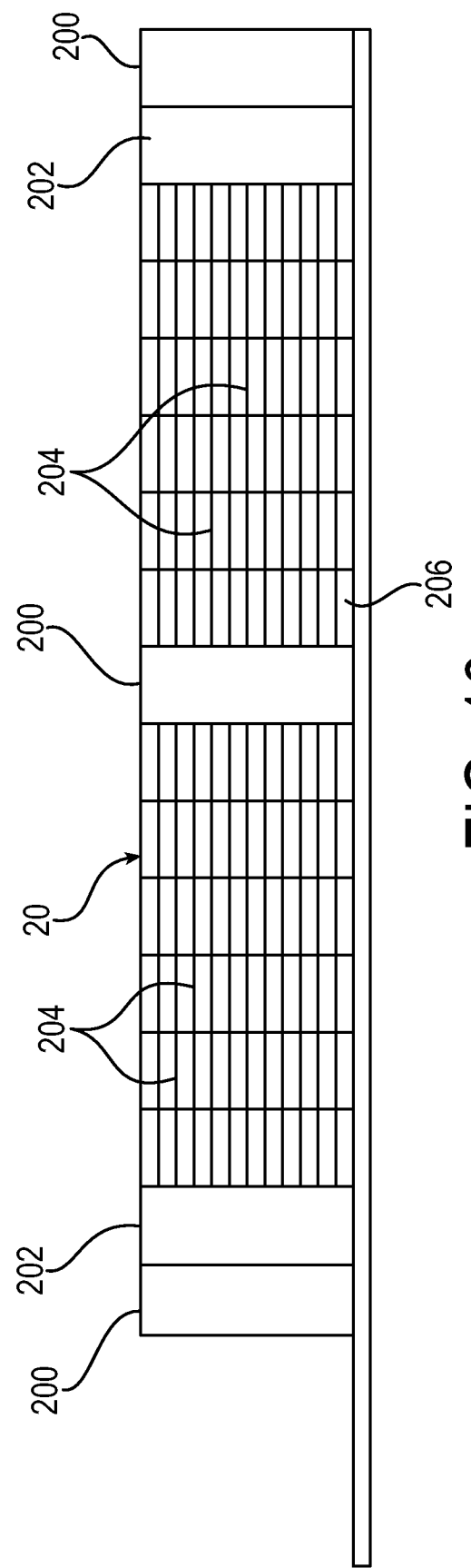

SHIPPING CONTAINER HANDLING SYSTEMS AND METHODS

CROSS REFERENCE TO RELATED APPLICATION

This application is a national phase application of PCT International Application No. PCT/US17/37488, filed Jun. 14, 2017 and is incorporated herein by reference in its entirety.

FIELD OF THE INVENTION

The invention is directed to a container port storage and distribution systems and methods wherein shipping containers are automatically manipulated for transfer of shipping containers from and to the transshipment vehicles.

BACKGROUND INFORMATION

The shipment of goods around the world has increased significantly, along with use of large ships or the like, to transport the goods. This in turn has led to use of ISO standardized international shipping containers as a preferred method of shipping goods. The shipping containers are manufactured in standard sizes which are generally twenty, forty or forty-five feet in length. Other sizes may be developed. The shipping containers are designed to allow loading into holds or decks of container ships or barges to travel across the ocean for example, or on rail cars or trucks to move cargo regionally.

At a shipping port for example, the shipping containers on a container ships are off loaded by on-board or on-shore cranes which are generally used to place the containers on dock areas. From the dock area, the containers are moved by one or more transport devices such as trucks, straddle carriers, fork lifts, automatic guided vehicles (AGV's) and the like, either to another form of transport to be shipped to a further destination, or to a storage area for subsequent handling. As it is intended to unload the ship as quickly as possible, containers are generally off-loaded and placed in storage for subsequent handling. Though allowing for speedier off-loading, the subsequent placement into a storage area then creates the problem of later retrieval and transport of the container. Generally, the storage area is of limited area, requiring the containers to be off-loaded from the transport devices such as trucks, straddle carriers, fork lifts, automatic guided vehicles (AGV's) and the like, by stacking cranes that stack the containers on each other four or five high and side by side, within the length and width of the stacking crane area. The trucks, straddle carriers, fork lifts, automatic guided vehicles (AGV's) and the like that transport the containers to the stacking cranes generally can only carry one or possibly two containers, increasing the time to get them stacked together. To then retrieve a specific container, containers on top may need to be repositioned before the specific container can be accessed, making for a very inefficient system. As the land areas available for docking space and the facilities to handle shipping containers arriving and leaving ports are generally shrinking, it would be desirable to increase the density of containers in storage for a given area. Although stacking of containers allows more containers to be stored in a given area, it would be desirable to allow more efficient access to specific containers for subsequent handling, while increasing storage density.

The systems used in handling the shipping containers also create environmental problems, including emissions from diesel engine powered equipment, such as the trucks, straddle carriers, fork lifts, automatic guided vehicles (AGV's) and the like. It would be desirable to allow such emissions to be substantially reduced. Such vehicles and the like also require human operation in many cases, thereby increasing labor costs. Other problems with such facilities relate to product theft from stored containers, as the containers are placed on the ground and are accessible.

In addition to the foregoing, there is very limited inspection of containers and the contents thereof as they enter the ports for both inbound and outbound cargo. This leaves containers, and thus ports, ships and other transportation vehicles vulnerable to terrorist attacks and other threats or problems.

In view of the foregoing, there is a need to further improve upon the manner in which shipping containers are handled and/or stored within port facilities and shipping terminals as well as to provide greater or increased security by providing for container inspection.

SUMMARY OF THE INVENTION

The present invention is directed to systems and methods for handling shipping containers in ports or other facilities. The system of the invention provides for a high density robotic container inspection, storage, sorting, quarantine and shipping system that is fully computer-controlled and automated for efficient handling of shipping containers. All phases of container movement are monitored and may be archived for permanent record-keeping for easy access and/or data management or mining. Methods of operating the handling of shipping containers are also set forth.

An object of the invention is directed at maximizing the number of containers that can be stored on a predetermined property, as well as increasing the efficiency of the transfer of containers between transshipment vehicles, such as cargo ships or barges, trucks or rail systems or the like.

In an example, the invention relates to a system a system for handling shipping containers with a first area for receiving shipping containers, the first area having at least one first conveyor on which shipping containers are positionable. The at least one first conveyor configured to move a shipping container to a first elevator system adjacent the levels of a facility. The first elevator system moves a container to one of a plurality of levels of the facility at a predetermined position, the facility having a length and a width, and the plurality of levels having a plurality of paths extending along one of the length and width of the facility. A plurality of transfer systems on each of the plurality of levels of the facility are provided, each of the transfer systems configured to move at least one container along the paths to move the at least one container from one side of the facility to the other. At least one second elevator system receives a container from one of the transfer systems on each of the paths on each of the levels of the facility, to be raised or lowered for introduction or removal from the facility by the at least one second elevator.

The container handling system stores and retrieves shipping containers in an automated manner, using a control system that operates a facility having a plurality of levels, including operation of a first conveyor system, a first and at least second elevator system, a plurality transfer systems, and other systems. Each of these systems are controlled to move a container to and from transshipment vehicles and between one or more levels of the facility. The control system also provides for automated tracking of containers so that the location and destination of the containers is always monitored. The system and methods also provide for non-invasive scanning of every container, wherein the scanning equipment is positioned above ground level to allow containers to be sequestered for further inspection if necessary.

The invention also relates to a method of handling shipping containers to transfer such containers between transshipment systems. The method comprises off-loading a plurality of shipping containers from a first transshipment system to a first conveyor situated on an platform elevated above the ground level. The off-loaded containers are moved to a first wheeled container elevator (WCE) associated with a facility having a plurality of levels. The first WCE moves the containers to one of a plurality of levels of the facility, the facility having a length and a width, and the plurality of levels having a plurality of paths extending along one of the length and width of the facility. A plurality of transfer systems are provided on each of the plurality of levels of the facility, each of the transfer systems configured to move at least one container along the paths to move the at least one container from one side of the facility to the other. The containers are then moved to at least one second WCE to receive a container from one of the transfer systems on each of the paths on each of the levels of the facility, to be lowered for removal from or introduction into the facility by the at least one WCE.

Other aspects of the invention will be apparent to those of skill in the art in view of the following written description and drawings relating to examples of the invention.

BRIEF DESCRIPTION OF THE DRAWINGS

FIG. 8 is a side partial schematic view of an example conveyor system according to the example of FIG. 5.

FIG. 9 is a partial schematic side view of a second example of a facility according to the invention.

FIG. 16 is a partial schematic side view of a fourth example of a facility according to the invention.

DETAILED DESCRIPTION

Figure 1:
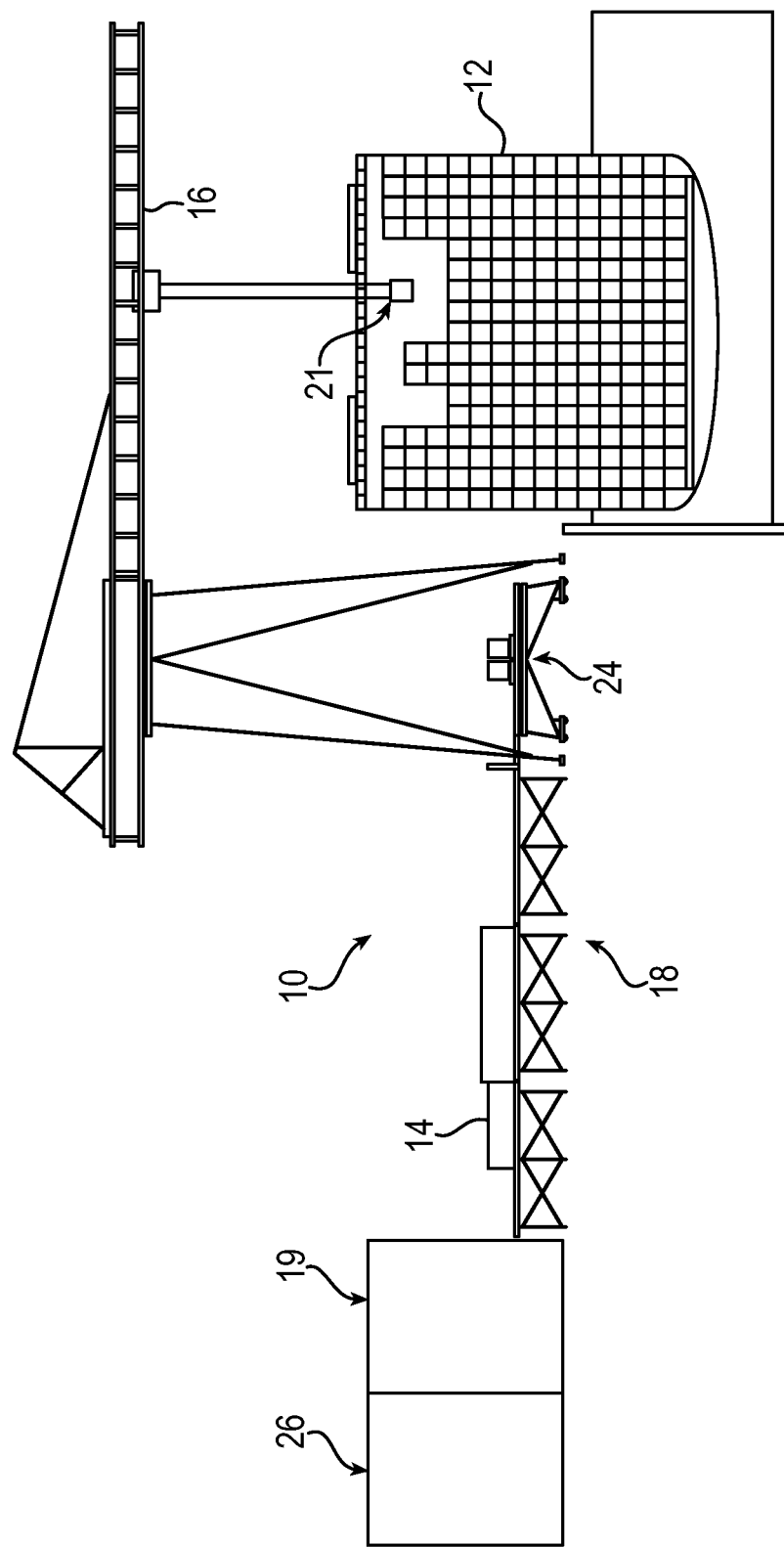
FIG. 1 is a schematic view of a first example of the systems and methods of the invention in relation to a port.

With reference to the Figures, examples of the systems and methods of the invention will be described in conjunction with shipping port facilities as an example. The systems and methods may be used in other facilities, such as railcar, airline, blimp or other shipping container handling environments. In each environment, shipping containers are off-loaded and handled to provide efficiency in receiving, temporarily storing and forwarding shipping containers or the reverse to load a transshipment vehicle. The systems and methods facilitate maximizing storage density, reducing power consumption and manpower necessary in such environments. The systems and methods allow for the automated storage and retrieval of shipping containers within a storage area in an efficient manner.

In examples, there may be provided a first area for receiving shipping containers. The first area has a plurality of first conveyors on an elevated platform on which shipping containers are positionable. The first conveyors are configured to move a shipping container to an accumulator area, which may include a first elevator system associated with a plurality of levels of the accumulator area. The containers may be weighed on the first conveyor, with this weight then being compared to the shipping weight supplied by original exporting location for differences. The containers may be subjected to non-invasive inspection. The facility may be provided with scanning systems to verify the identification of each container. A buffer zone may be provided for preliminary positioning of the containers in the facility. The first elevator system moves a container into the accumulator area, which may have a plurality of levels. Alternatively, the containers are moved into and out of a facility having a plurality of levels. Each of the levels includes systems to move the containers within the facility, as will be described with reference to examples hereafter.

In each of the examples, the containers may remain in an elevated position in the facility until removal is desired. There may be provided a scanning system to prevent human entry from below, above and all four sides of the facility, for secure handling of the containers. Further, the location of every container within the facility is tracked and available in real time to approved users. All phases of container movement may be monitored and archived for permanent record-keeping for easy access and/or data management. This also allows records to be forwarded to the next port of call to expedite Customs clearance and shorten delivery time to importers.

The container handling systems of the invention store and retrieve shipping containers in an automated manner, using a control system, such as a computer control system including multiple processors and/or PLC's, that operates all systems within the facility, on each of the plurality of levels, and between levels. The systems are controlled to move a container to and from transshipment vessels or vehicles and between one or more levels of the facility. The control system also provides for automated tracking of containers so that the location and destination of the containers is always monitored. The system and methods also provide for non-invasive scanning of every container, wherein the scanning equipment is positioned above ground level to allow containers to be sequestered for further inspection if necessary.

The methods of handling shipping containers according to the invention allow automated transfer of containers between transshipment/local shipment systems. The containers are off-loaded from a first transshipment system, such as a cargo ship or barge, truck, train or the like. The off-loading may be by crane, which positions the containers on a first conveyor situated below the crane on an platform elevated above the ground level. The off-loaded containers are positively identified and moved through a non-invasive scanning system. The elevated platform is movable into alignment with the crane and facility systems. The containers are moved from the elevated platform to a first elevator associated with an accumulator area or the facility, which has a plurality of levels. The containers are moved via the first elevator to be positioned on one of a plurality of levels of the facility. The containers are then moved by a second elevator for positioning a container on a second transshipment/shipment system.

Off/On-Loading and Optional Accumulator Area

Examples of the invention will be described with reference to a port facility, such as is shown in FIG. 1, and includes a docking area 10 for at least one container ship 12. The container ship 12 is designed to store international storage and shipping containers 14 in a number of hold areas. The containers 14 may be stacked one upon another within each hold area as shown in FIG. 1. The containers 14 may be different sized containers, and are generally 20, 40, 45 or 53 feet long, by 8 feet wide, and by either 8'6" or 9'6" tall currently. The system will be able to accommodate any and all size containers that may become standard for the container industry in future years for example.

The containers 14 are off/on-loaded from the container ship 12 by at least one crane 16, but typically will include a plurality of such cranes 16. The cranes 16 are referred to as container cranes, container handling gantry cranes or Quay cranes for example, but any suitable system for lifting the containers 14 from ship 12 may be used, including ship-to-shore cranes for example.

Figure 2:
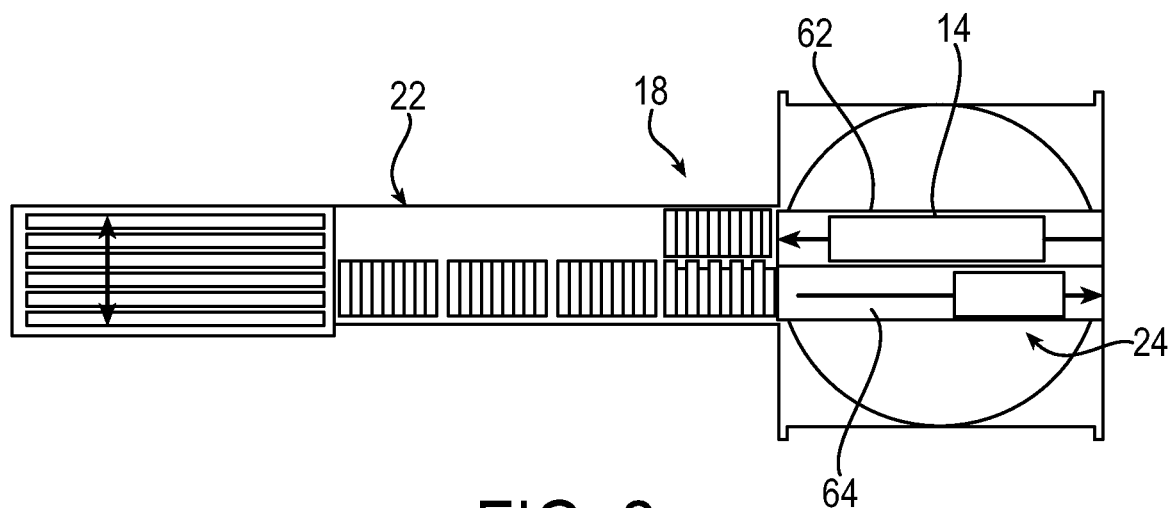
FIG. 2 is a top schematic view of component systems as shown in the example of FIG. 1.
Figure 3:
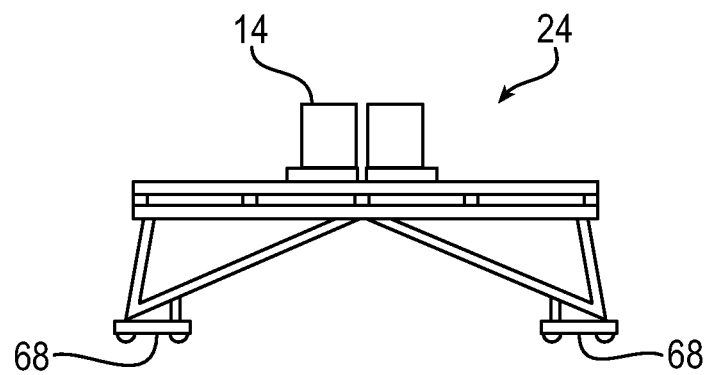
FIG. 3 is a side partial schematic view of component systems as shown in the example of FIG. 1.

The container cranes 16 are movable relative to the ship 12 to access the containers 14 in the hold areas. The cranes 16 move the containers 14 onto an elevated inspection platform 18 positioned between the crane(s) 16 and an optional accumulator area 19. As shown in FIGS. 2 and 3, the containers 14 are positioned on a first transfer system 24. The first transfer system 24 may have load cells that record the actual weight of the received container 14. This weight can be compared to the shipping weight supplied by original exporting location and compared for differences. Also on this first transfer system 24, an identification system, such as OCR cameras, RFID or like systems yet to be developed, may record for the control database the unique ID and any other requirements relating to containers 14. It is at this point that the ports quay crane ID information may be compared to that of the OCR camera or other inspection system to ensure that the operator is tracking the correct container 14 and its export documentation. Should there be a difference in the information, the container 14 may be stored in a quarantine area of the facility, so that the discrepancy can be corrected by a visual inspection. On the elevated transfer/inspection platform 18 is provided a suitable drive systems or conveyors to move containers 14 positioned thereon from and to a crane 16. In the example shown, the elevated inspection platform 18 may include a first transfer system 24, such as a rotary table, and two (or more) conveyor paths 62 and 64 for transfer of containers 14 in both directions.

In a particular example, a container 14 is removed from the ship using the crane 16. The crane 16 places the container 14 on a transfer system 24, such as a rotating or rotary table, which may be installed at the cranes lowest set of cross structural beams for example. These beams are typically 15 to 20 feet above the ground, such that the elevation of the entry into the facility 20 (examples described hereafter) is well above ground level. This arrangement provides protection of the containers for security. It may be configured that the container does not come below this height until a container 14 is requested by Customs for physical inspection, shipping or transshipment with secure Customs release code. This arrangement also makes it easier for the operator of crane 16 to unload the container 14 from the ship 12. Alternatively, the containers 14 may be loaded onto another transport device as may be suitable for a particular situation. Alternatively, the transfer system 24 may be mounted on an independently traveling base adjacent crane 16. Also, the crane 16 may be a include an indexing device, such as a rotary spreader/container grapple 21, between the crane towers traveling base, instead of or in addition to a rotary table 24. Such a rotating container grasping spreader 21 attached to crane 16, can secure, rotate and position a container 14 from crane 16 on a conveyor 62 or 64 or the like, to be moved to or from the next system. If an independent rotary table 24 is used, then a section of conveyor may be provided to receive containers 14 from ship (ship unloads can be single, double or quadruple containers at one pick up by the crane 16), so the receiving conveyor 62 or 64 would be of capacity and ability to sort the containers into single file to be forwarded into the next system or transfer area.

Associated with the inspection platform 18 may also be a non-invasive inspection system 22, that may include any suitable inspection system, such as a non-invasive or non-intrusive inspection system. Such a system may use radiography technologies such as gamma-ray radiography, x-ray or neutron activation systems for example. Other systems, such as passive radiation detectors, such as muon tomography, gamma or neutron detectors, gamma spectroscopy or the like for example. In current handling of shipping containers, inspection may occur in a random fashion, wherein the non-invasive inspection system 22 allows for all of the containers 14 leaving or entering a ship 12 to be inspected. The current worldwide rate of container inspection is a meager 3 to 4% of all containers. Many inspections require a complete manual unloading of the entire container's cargo, being both time consuming and expensive for Customs as well as significantly delaying the goods from reaching the end user. The automated non-invasive inspection system 22 can detect nuclear threats and show "MRI" quality pictures of the specific cargo within the container. The non-invasive inspection system 22 can process in excess of 150 containers per hour using the automated system of the invention, as compared to limitations of the current shuttle system using human driven trucks to move the container from the ship to a remote container x-ray station that limits process speeds to about 5 to 15 containers per hour. The current approach to inspection of a small number of containers 14 is done by driving a truck through an x-ray machine. This leads to voids of time and blurry images because the truck does not move at the same speed through the field of vision of the machine. Should Customs have questions about a container 14, the system of the present invention will be able to automatically send that container 14 into a hold/quarantine area if Customs requests that to be done or send containers on for distribution. The system of the present invention would allow security and Customs to review 100% of the containers coming into and leaving a port. The automated transfer system of the invention will allow the capacity of the non-invasive inspection system 22 to be utilized. The conveyor 24 moves the containers 14 through the inspection system at a predetermined substantially constant speed for proper imaging. The process will speed up Customs clearing by a factor or 10 to 30 times the current rate. Further, currently many shipments are misclassified to avoid higher tariffs. The 100% non-invasive scanning will stop this practice from occurring and increase the revenue stream for the Governments clearing the items.

In an example, the Customs Department would have an scanning control center in the facility, such as in position to face the non-invasive inspection system 22 and ship 12, that will allow either remote or manned cargo review that is contiguous to the inspection area. In the United States for example, Customs currently has a rule that when a container inspection occurs, a Custom Agent must physically witness the inspection. The Customs inspection review office could be within full view of the raised transfer platform 18 holding the non-invasive inspection system 22. The same process for containers coming into the Port and into the facility 20 to be shipped from the Port may be done on the inbound side of the facility providing the same increases in efficiencies.

After inspection of a container 14, next the container is automatically moved out of the non-invasive inspection system 22 and onto the next equipment component. The container 14 is then movable via an alignment system, such as driven alignment rollers 68, that can move the containers 14 left or right as well as shuttling the containers into a transfer system of the facility. This alignment process may be required since when a ship arrives at the pier it will not necessarily align to the container spacing arrangement in facility 20. Few if any ships are built with the same spacing as to their cargo hold location. Also, every ship docking may be out of alignment with the storage compartments as docking ships is not an exact science. The alignment of the systems 18 is simple, compact and quick, allowing the containers 14 to be efficiently moved into or out of a facility. For example, the transfer/inspection platform 18 and systems may be mounted on one or more traveling bases if desired, and integrated into the container transfer system at an appropriate location. The traveling bases that may be used in the off/on-loading systems associated with the transfer/inspection platform 18 allow the components to be easily moved to another ship location to transfer containers to and from the ship 12. The off/on-loading area and systems may be monitored by closed circuit infrared CCTV, or other suitable surveillance systems. There may also be provided a laser scanning system to prevent human entry from below, above and/or sides of the transfer/inspection platform 18 for secure handling of the containers 14.

The cranes 16 may lower and raise containers 14 onto and from platform 18. The cranes 16 are able to unload or load approximately one container 14 in 40 seconds to one minute. In current practice, the cranes 16 are used to unload the majority of the inbound ship before they begin to load containers back onto the ship. Using this approach, a cranes efficiency rate is generally no better than 50%. With the automated system of the invention, because the system has the capacity and ability to receive and supply both incoming and outgoing containers, this can improve efficiency of the crane by 20 to 25% or better for example. Once positioned on inspection platform 18, the container 14 may be positively identified. For description, the unloading of the ship 12 will be described, but the reverse operation is usable to load a ship 12. The crane 16 secures a container 14 from within the hold of the ship 12, and raises it up above the ships deck cargo containers and retracts to the shore and transfer/inspection platform 18. The container 14 is lowered onto a transfer system 24 that is either a separate piece of equipment or incorporated into the crane 16.

In the current unload systems, the containers are lowered and loaded onto trailers of diesel tractor trailer rigs driving between the support legs of the crane. This is a time consuming process as the crane has to adjust to the location of each truck. In the systems of the present invention, the receiving transfer system 24 positioned under the crane 16, instead of a narrow truck trailer, is nearly 2 feet wider than the container 14, allowing the crane operator improved cycle efficiencies of 15 to 20% because the operator does not have to go slowly to "zero" in on the target of a narrow truck.

Figure 4:
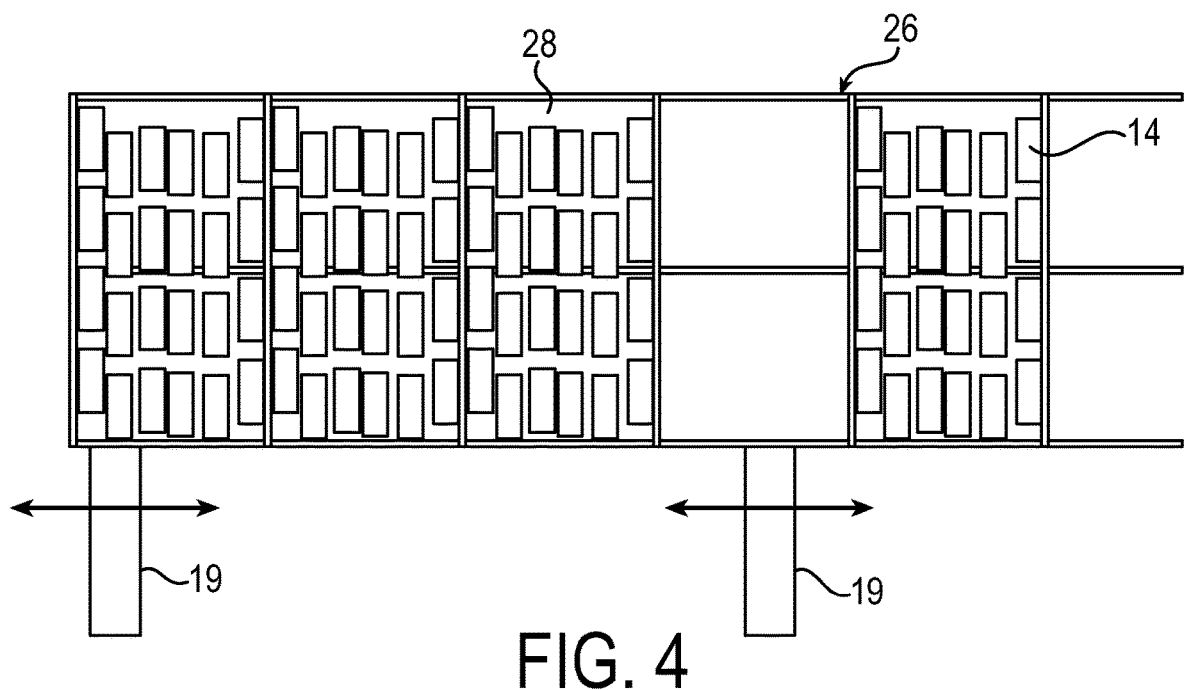
FIG. 4 is a top schematic view of an accumulator region according to an example.

There may be provided an optional accumulator facility 26 as shown in FIG. 1, into which containers 14 are automatically moved when off-loaded or prior to on-loading. The transfer system(s) 19, such as a movable wheeled container elevator (WCE), is movable transversely along the area adjacent a facility into which containers are then moved and handled. The transfer system 19 allows movement of a container 14 into a control system assigned position on one of the levels of the accumulator 26. As seen in FIG. 4, the accumulator 26 may be a buffer facility of containers 14 that are either inbound or outbound. The accumulator 26 may be of an open grid floor construction, with conveyors 28 to move containers 14 into or out of an adjacent facility. The conveyors 28 may be of any suitable type, such as belt, chain, roller of the like.

The storage and handling facility 20 and its component systems may be designed for the different types of facilities for container handling, depending on various factors, such as size, amount of containers handled, footprint of the facility and many other factors. Examples of different systems for examples of such facilities are described, but it should be understood that each such facility may use a combination of the subsystems as described in such examples.

The facility 20 includes systems for handling shipping containers. In general, the facility 20 comprises has a length and a width, and a plurality of levels having a plurality of paths extending along one of the length and width of the facility 20. A first elevator system is provided adjacent the levels of a facility 20. The first elevator system moves a container to one of the plurality of levels of the facility at a predetermined position. A plurality of transfer systems are provided on each of the plurality of levels of the facility. Each of the transfer systems is configured to move at least one container along the paths, so as to move the at least one container from one side of the facility to the other. At least one second elevator system is provided to receive a container from one of the transfer systems on each of the paths on each of the levels of the facility, to be lowered for removal from the facility 20. Examples of such facilities will be described hereafter.

System 1

In a first example, the systems and methods of the invention will refer to a facility 20. In an example, with reference to Figs. such a facility 20 may be applied to smaller container terminals working approximately <400,000 Twenty-Foot Equivalent Units (TEU's) per year or racking for 5000 TEU's at 72 turns of containers per year (5 day TEU dwell time as an example, but each port will be unique). The system creates storage of 400 to 500 TEU's per acre, depending upon number of storage levels and port land availability.

Figure 5:
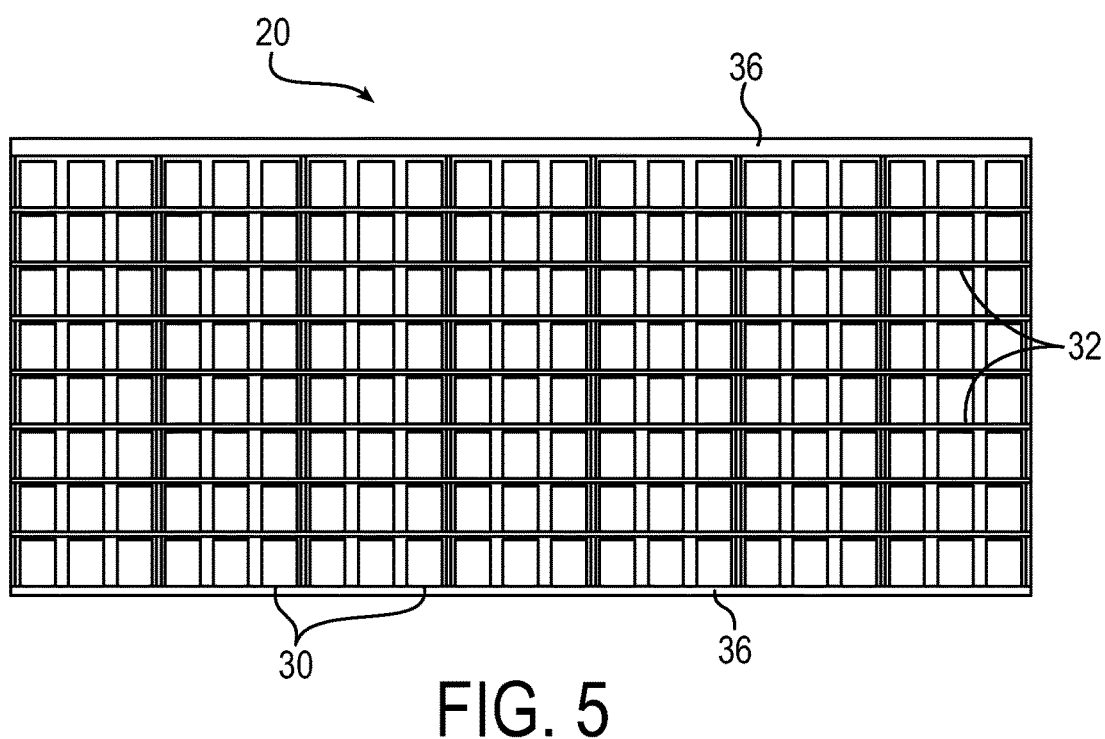
FIG. 5 is a partial schematic side view of a first example of a facility according to the invention.
Figure 6:
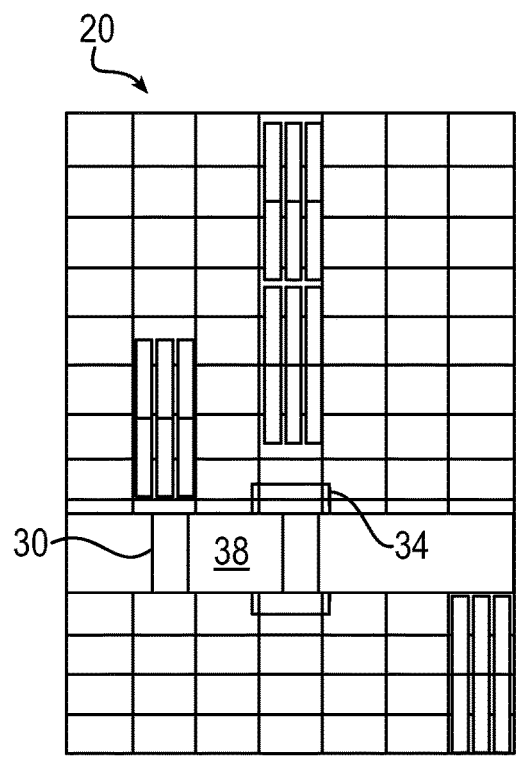
FIG. 6 is a top schematic view of the system as shown in FIG. 5.

In an example of a facility 20 with reference to FIGS. 5 and 6, there may be provided a plurality of WCE's 30 operating an intervals within the facility 20. The WCE's 30 raise and lower containers 14 to be moved around in the facility 20 or into/out of the facility 20. The facility 20 may be formed as a structure with a two or more floors 32. In an example, A WCE is a system arranged in an aisle of the facility 20, to move transverse to the aisle to access the entire dimension of facility 20 along the aisle. The WCE 19 may have a driven base assembly, for movement on tracks or other suitable arrangement by driven wheels or the like. On the driven base system, an upright frame extends to the top of the facility 20. The upright frame supports an elevator that is movable from top to bottom, to access the entire vertical and horizontal dimensions of the facility 20. A top running support (described hereafter), may be provided at the top of the upright frame to support the frame at the top, and avoid possible toppling thereof. The top running support may also be driven. The elevator portion is sized to accommodate one or more containers 14 as may be desired, and a suitable hoist system to lift and lower the elevator in an efficient manner, which may be performed as the base system moves the elevator to a different position in the aisle. If desired, multiple WCE's 19 may be provided in an aisle, or can be stacked on one another to service different levels of facility 20. The movement of the containers 14 from and to the WCE's 30 may be provided using a system 34 to lift and lower, position, retrieve or deposit a container 14 to a desired location on one of the floors of the facility 20. The system 34 may be conveyors, overhead hoists, low profile ship to shore spreaders or the like.

The containers are stored one deep or multiple deep depending upon the capacity needs of the container port. If the containers are multiple deep on a floor, then the containers may need to be "shuffled" into open spaces on the same or other floors 32, until the desired container is available for the tugs, hoist or conveyors or the like to extract or introduce the containers 14. The WCE 30 may have driven wheels/end trucks 36, at least at the bottom of the WCE 30, that allow movement on a track system or the like. The WCE 30 may thus be moved to any desired location exterior or interior of the facility 20, to position and retrieve containers in any storage location in association with the shuttles 42. A lift platform is driven vertically within a frame system to lift the containers 14 to or from a desired storage position in facility 20 as needed. The elevator system may use a lifting system incorporating a rigid chain lift, hydraulic, geared winches, lever actuated push/pull actuators or other suitable systems. The WCE 30 may or may not have top running 'anti-topple" driven or non-driven wheels/end trucks 36 to allow higher speed travel of the WCE with rapid slow down and acceleration capability, while also preventing the WCE from tipping or toppling over during acceleration or deceleration.

In this example, the containers 14 may continuously exit from the non-invasive inspection described above, without stopping the flow of containers 14 leaving the ship (or the like), or going onto the ship.

In FIG. 6, there is shown an aisle 38 within facility 20 in which one or more WCE's 30 cycle left and right while raising/lowering a container 14 to the level the container 14 will be inserted into the facility structure, or is removed for transshipment. WCE's 30 may be situated on the water side or adjacent the accumulator 26, embedded within the facility 20 in aisle(s) 38, as well as at another end or side of the facility 20.

Figure 7:
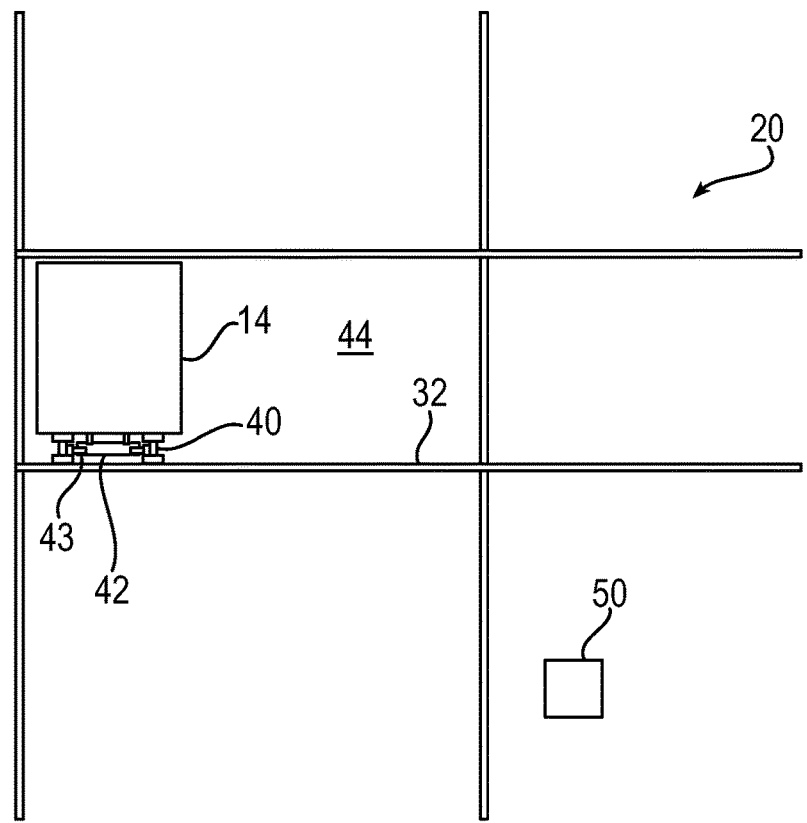
FIG. 7 is a partial schematic view of a level associated with the facility in the example of FIG. 5.

Turning to FIG. 7, there is shown the general layout for a facility "apartment" for the containers 14. There will be a container spacer 40 which doubles as a track for a robotic shuttle or tug 42 that will lift and insert a container 14 into the apartment via the spacer tracks 40. Many configurations can be similar to the spacer 40 and the transfer system, such as a tug or shuttle 42. If within the facility 20, the containers may be multiple deep, and are shuffled into position to be removed when needed to move on to the next location. Shifting of containers 14 may be by moving containers 14 into open apartments within the facility 20, which may be above, below, beside, etc., to make room for the specified container 14 to be moved to the desired location.

As an example, as shown in FIG. 7, the containers 14 may be moved by "tugs" or shuttles 42 on which they are supported, that travel on rails/beams or the like, on the WCE lift platform and floors 32, to transfer containers 14 off/on a WCE lift platform into/out of the storage facility 20. Alternatively, the containers 14 may be positioned on a supporting structure such as a conveyor system 70 and corresponding runways or rails 72 as shown in FIG. 8. In this example, the conveyor 70 is a chain conveyor, but any suitable conveyor system may be used. Modular sections of the conveyor 70 may be disposed between upright supports 71 in the facility 20, to facilitate changing out or repair of the conveyor 70.

The facility 20 will normally comprise multiple levels 32 to take advantage of effective land use while affording the handling of a large number of containers. Using the multiple transfer shuttles 42, such as from 2 to 8 or more shuttles per floor, the transfer shuttles 42 are capable of transporting and transferring out containers 14 from each of the bays 44 into another bay 44 and/or move containers 14 to a WCE 30.

The sub-systems may be controlled by a control system 50 (shown schematically), including management software and systems. The control system 50 controls components including transfer shuttles or tugs 42, WCE's 30, and all other systems. Each of the bays 44 is formed with a width to accept one or more containers 14, and a length to accept one or more containers 14. In each bay 44, the spacers 40 or the like are provided to work in conjunction with the transfer system 42 or 70, to move each container to a predetermined location in the bay 44. In the example of FIG. 7, the transfer system 42 may be used to lift and move a container to the predetermined location in the bay 44, and then be moved back to position to handle a next container 14. The lift mechanism associated with the transfer system 42 may be any suitable system, such as a scissor lift, hydraulic cylinders, lift arms or the like. The shuttle 42 is moved by drive members 43 which engage the rails 40 or other support members. In moving the container 14, the shuttle 42 may be configured to support the weight and dimensions of the particular container 14, and additional drive members, alignment members and/or lift members may be used if desired. In this example, the shuttles 42 may be replaced with another suitable transfer system. The transfer system 42 may have interlocking members (not shown) on the side adjacent the elevator system 30, and the elevator system 30 may have corresponding interlocking members to be secured in an interlocking position to positively position the transfer system 42 in a desired position relative to the elevator system 30. Any suitable system for positive engagement between these systems may be used, or no interlocking system may be needed. In the example of FIG. 8, the conveyor 70 moves the container 14 to the desired location in the bay 44.

System 2

Figure 10:
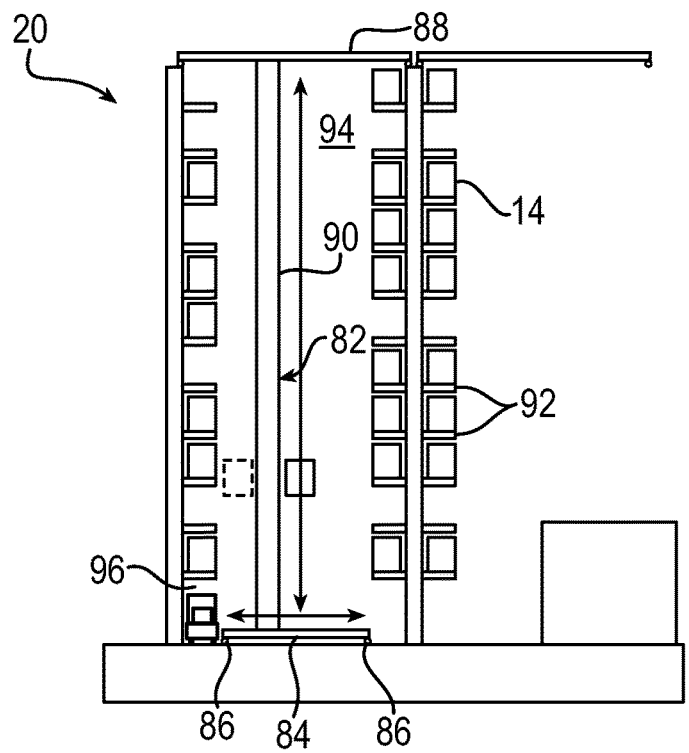
FIG. 10 is a partial schematic side view of the second example of a facility as in FIG. 9.
Figure 11:
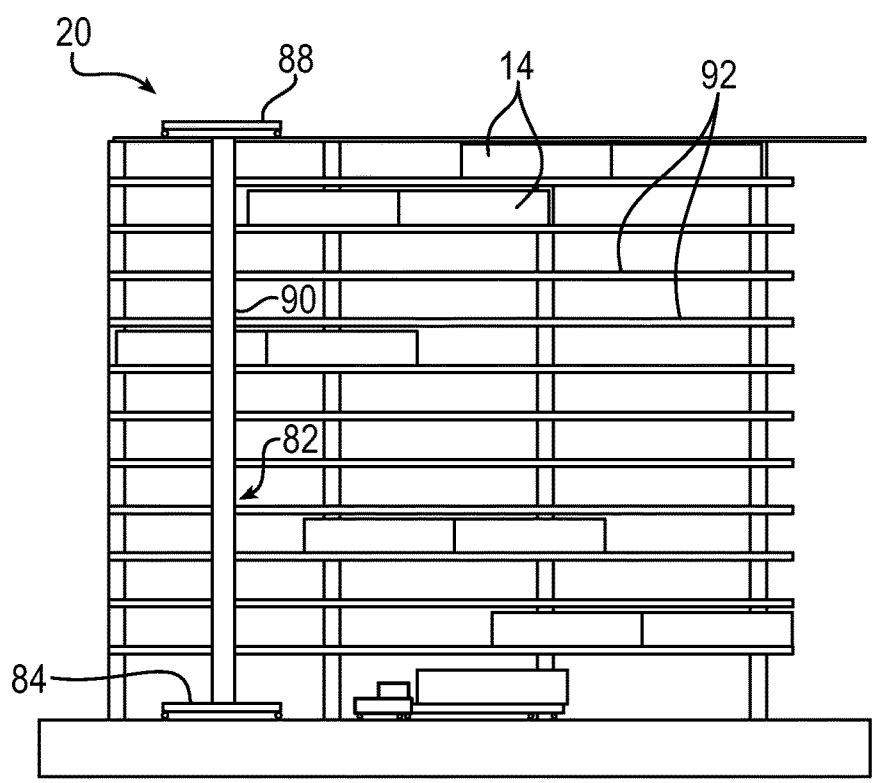
FIG. 11 is a side partial schematic view of the second example of a facility as in FIG. 9.

Another example shown in FIGS. 9-11, may be useful for a medium sized container terminal, such as one that handles approximately 400,000 TEU's/year to 1,000,000 TEU's per year, 72 Turns dwell (5 days per TEU in Terminal), 14,000 TEU's storage capacity. The system 20 can create storage of approximately 600-1200 TEU's per acre for example. Again in this system 20, there may be optionally provided an accumulator area and/or a non-invasive inspection system and the like for receiving containers 14, as described in a previous example. The containers 14 may again be fed into the facility 20 by one or more WCE's 30 as described earlier, which receives the containers 14 of any size. Alternatively, Container Trucks (or port bomb trucks), Automated Guided Vehicle's (AGV) or the like will bring/feed containers 14 to the loading area 80 of the storage facility 20 as shown in FIG. 9, which can be at ground level or at an elevated level as determined by the specific design required by any facility. The container 14 brought by the delivery method chosen is then lifted from the side or top as specified by the port, such as by a WCE 30. As in the previous example, the WCE 30 may have a driven base assembly 84, for movement on tracks or other suitable arrangement by a drive system 86 such as rubber wheels, steel wheels, maglev lifting or the like. On the driven base system 84, an upright frame or support 82 extends to the top of the facility 20. In this example, the upright frame is a mast 90 that supports an container handling system and elevator system 87 that is movable from top to bottom as shown by arrow 83, to access the entire vertical and horizontal dimensions of the facility 20. The elevator 87 may be of any suitable type, such as a container support structure that moves in a frame, as described previously, or as in this example, as a mast or column 90 on which a suitable container handling system is movable along. A top running support 88, may be provided at the top of the upright frame 82 to support the frame 82 or mast 90 at the top, and avoid possible toppling thereof. The top running support 88 may be coasting or also may be driven. Driving the top running support 88 may allow the WCE 30 to accelerate and decelerate as fast as is required to meet system throughput quantities. The elevator portion 87 is sized to accommodate one or more containers 14 as may be desired, and a suitable hoist system to lift and lower the elevator in an efficient manner along the direction shown by arrow 83. The up/down movement of the elevator 87 also may be performed as the base system moves the elevator to a different position in the aisle. If desired, multiple WCE's 30 may be provided in an aisle, or can be stacked on one another to service different levels of facility 20. In this example, the WCE 30 may also be movable along the direction as shown by arrow 85. In this example, the WCE 30 has a mast 90 of the height of the facility 20 to allow containers 14 to be stored/placed in cantilever racks 92, that allow one or more levels of containers 14 to be stored within the facility 20 along aisles at the location of each WCE 30. The containers 14 may be placed on or retrieved from a rack 92 by the manual or computer controlled WCE 30. In this example, the WCE 30 may use one or more side grasping or side-lift spreaders, top-lift spreaders, forks (not shown) or other suitable container handling system for lifting and handling of containers 14. As an example, side grapples or forks, like a fork lift truck can be provided that rotate about the column 90, to lift containers on both sides of the aisle. There can be a single lifting device with a rotating column, two lifting devices mounted on sides of the column that face each side of the aisle of the cantilever racks, or lifting systems that move to each side of a column to allow quick access to containers on both side of the aisle or WCE 30. The column may be movable towards or away from the cantilever racks on either side of the aisle if needed. A system to allow lifting of containers on both sides of the column of the WCE 30 may allow the aisle size to be as narrow as possible. Any suitable arrangement is contemplated to allow access to containers on both sides of the column 90 in this example of the WCE 30. The lifting systems are moveable up and down the column using any suitable system, such as hoists, geared drive heads, chain drive or the like. The WCE 30 may service only one bay 94, or the system can be equipped with WCE switches that allow the crane to move at either end of storage bay 94 to the bay 94 next to it or the like.

There may be multiple bays 94 along a paths within the facility 20, and each of the bays 94 may be of any practical length to service the number of containers 14 needed within that bay 94. There may also be within a bay 94, multiple WCE's 82 that would allow faster transfers, sorting, feeding, etc., on either end of the bay 94 along the path.

Using these components, the facility 20 may also allow for simultaneous ground level loading for trucks, rail, AGV's or other like transport systems. The control system 50 and operating software performs the complete management of all container movements, sorting requirements, memory/logging of shipments, sequencing of containers for land transfer, outgoing containers, transshipments, and all other functions. At each end of facility 20, there may be provided an aisle 96, which may be used to load and unload rail cars, trucks or the like on the ground level of the facility 20. WCE's can place a container 14 on the transshipment vehicle at these locations. The systems allow moving and transferring the heaviest container shipments at a fast speed and with high accuracy. The WCE's 82 are computer controlled for speed and accuracy in association with other components to quickly move containers 14 as needed. Other suitable transfer systems may be used at the loading or unloading stations 96, such as a container transfer and handling systems produced by EagleRail Container Logistics, or there may be provided conveyors (not shown) that are mounted at ground level that can move the containers 14 as they are loaded into the aisle stations. If conveyors are included in the design then those conveyors could move containers for further handling. The input and output stations 96 may run the entire length facility 20 if desired.

System 3

Figure 12:
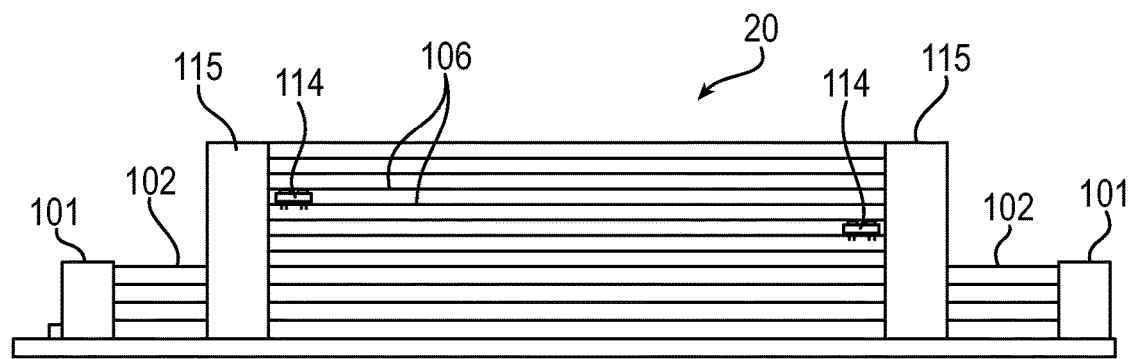
FIG. 12 is a partial schematic side view of a third example of a facility according to the invention.
Figure 13:
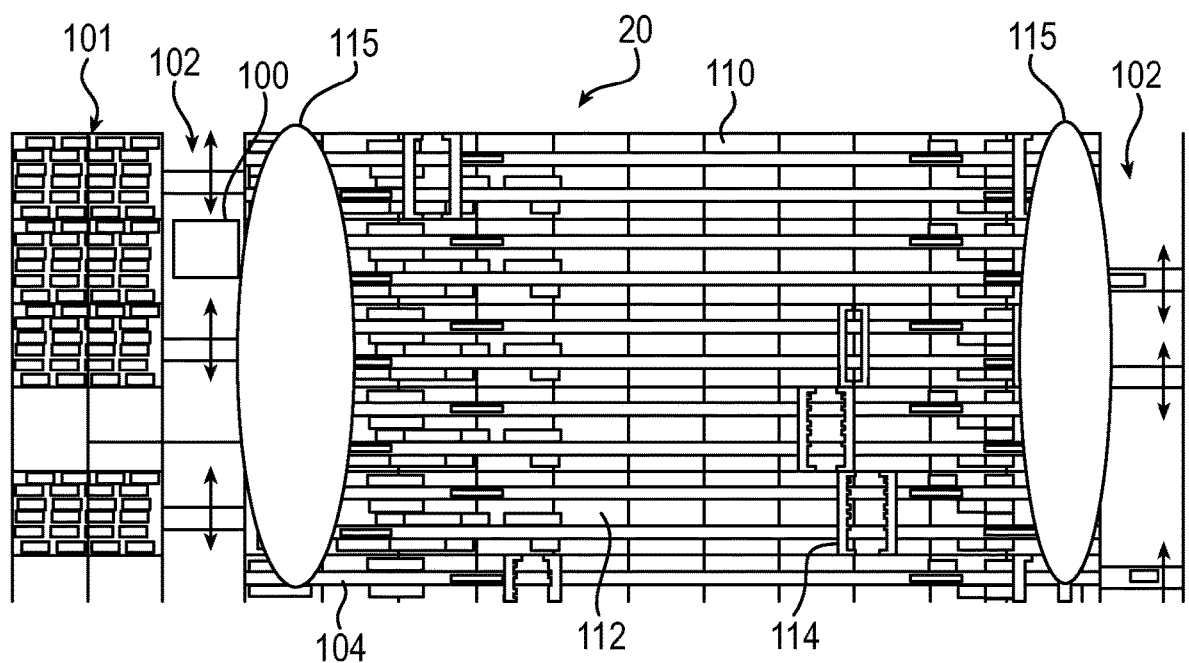
FIG. 13 is a partial schematic top view of the example of FIG. 12.

Another example shown in FIGS. 12-13, may be useful for a large sized container terminal, such as one that >1,000,000 TEU's+ per year, or ports doing 2 to 5 million TEU's per year. As an example, the system can create storage of 1200-1600 TEU's per acre. Again in this system 20, there may be optionally provided an accumulator area 101 and/or a non-invasive inspection system on one or both sides of the facility 20, or the like for receiving containers 14, such as described in a previous example. In this example, facility 20 has a plurality of floors 106, with a plurality of paths or aisles 112 running full length of facility 20. An aisle 102 may be provided at ends of facility 20, in which one or more WCE's 100 operate. The containers 14 may be arranged side by side in pairs (or more) for example, and an open aisle 104 may be provided between the arranged containers 14. The containers 14 may be side shifted at areas 115 on each side of facility 20, such as by one or more side shift cranes 114 (shown in more detail in FIGS. 14 and 15 for example) on each floor 106. The side shift cranes 114 may extend across plural aisles to handle containers 14 in any of the aisles which it services. Within areas 115, which are adjacent to an aisle 102 for WCE's 100 or the like, there may be provided a suitable conveyor system (not shown), to move containers onto or from a WCE 100 on either side of the facility 20. Containers 14 may be picked up from the areas 115 by a side shift crane 114 and moved into the aisle or possibly into an open space in an adjacent row. Cranes 114 may be configured to allow movement of containers between aisles 112 and/or along the aisles 112. In one example, cranes 114 are provided on each end of facility 20 and may move containers from one end to the other, or to a position intermediate thereto, if desired. Other types of suitable systems to move containers are contemplated.

The containers 14 may again be fed into the facility 20 by a WCE 100 as described earlier, which receives the containers 14 of any size. Alternatively, another type of suitable transport system may be used to bring/feed containers 14 into facility 20 the loading area of the storage facility 20, which can be at ground level or at an elevated level as determined by the specific design required by any facility. The systems move containers 14 onto one of the levels 106 of facility 20. A further WCE 100 may be positioned to receive and move containers 14 to any desired floor 106 if desired.

Figure 14:
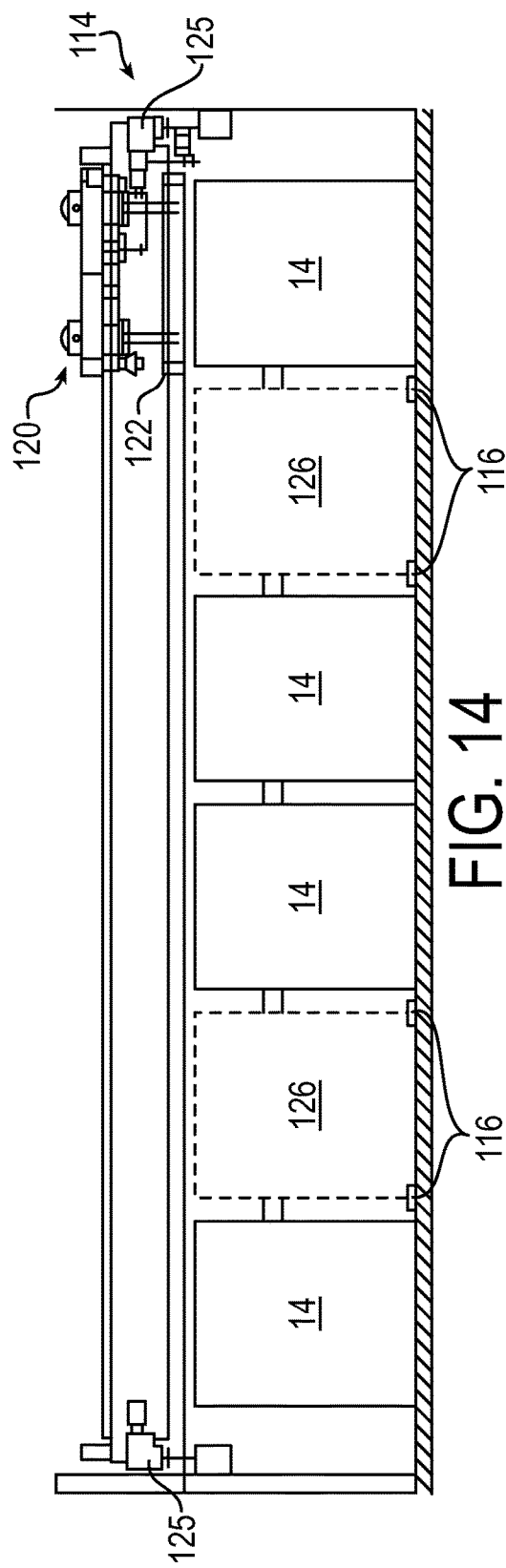
FIG. 14 is a partial schematic end view of a side shift system according to an example.
Figure 15:
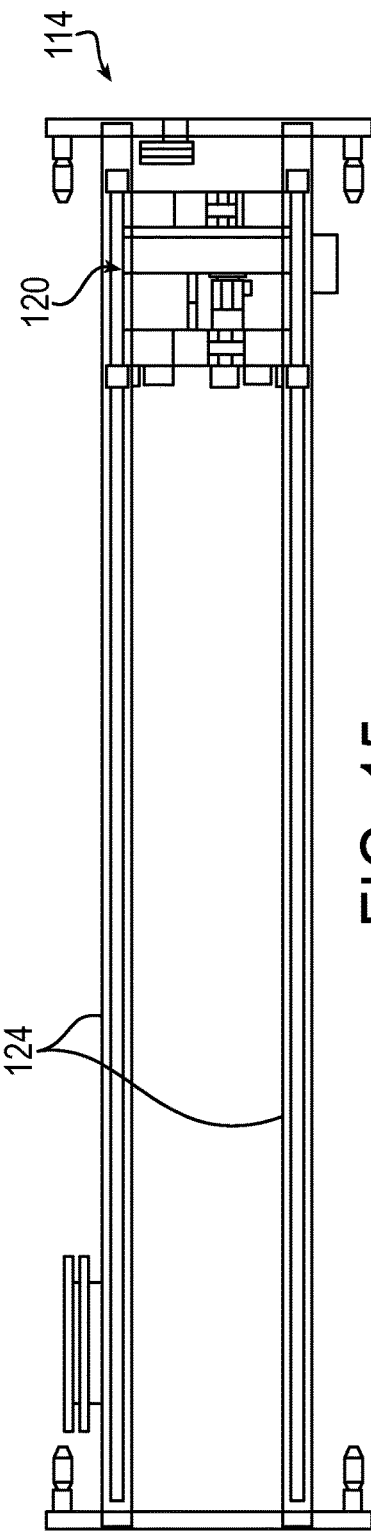
FIG. 15 is a partial schematic top view of a side shift system as in FIG. 14.

An example of a side shifting system 114, such as a side shifting crane, is shown in FIGS. 14-15. The side shifting system 114 allows the lifting and then side shifting of containers 14 between and/or along the paths 112. The side shift systems 114 may be a small overhead crane 120 for example. The crane 120 may be dedicated to a plurality of aisles 112 as previously described. The crane 120 may include at least one spreader bar or lifter 122 or the like, for securing and lifting the container 14, and moving it as desired. The crane 120 is mounted on tracks 124 for movement in a direction substantially perpendicular to the path 112, and tracks 125 to allow movement along the path 112. In an example, the crane 120 is computer controlled to move containers 14 as needed. A plurality of cranes 120 may be operated together via an electronic line shaft or other suitable system. In an example, a crane 120 services 6 rows or aisles 112. Rows 2 and 5 are open aisles as shown at 126 and allow movement of containers 14 by a crane(s) 120 to one or the other end of facility 20 for transshipment. At each end, containers 14 are moved onto or from a WCE 100 at the open Aisle 2 or 5 for example, by a suitable conveyor system 116 at these aisles 126, for movement of containers 14 onto or from a WCE 100. The cranes can also shift containers 14 and position them in rows 1, 3, 4 or 6 for example. In this example, a crane 120 services 6 rows or aisles 112, but any suitable configuration is possible. Alternatively, the side shifting systems 114 may be a slide device under the containers 14, which has a conveyor or cassette, that slides sideways to shift the containers, or actual conveyors that move the containers along and then the side shifters that index the containers to a WCE 100 or another path. Other suitable systems to allow side shifting and conveyance systems similar to cranes 120 and conveyor systems 116 may be used.

System 4

Another example shown in FIG. 16, may be useful for ports with significant shortage of land doing over 1 million TEU's per year. In this example, facility 20 may include and is the original Conveyor transfer system within the facility with Multiple SWE's. Can create storage of 1800 to 2200+ TEU's per acre. Again in this system 20, there may be optionally provided an accumulator area and/or a non-invasive inspection system and the like for receiving containers 14, as described in a previous example. The containers 14 may again be fed into the facility 20 by a WCE 200 as described earlier, which receives the containers 14 of any size. Alternatively, another type of suitable transport system may be used to bring/feed containers 14 into facility 20 at the loading area of the storage facility 20, which can be at ground level or at an elevated level as determined by the specific design required by any facility. The containers 14 are deposited into area 202 where they may be side shifted to another of a plurality of paths on a plurality of floors 204, with side shifting systems such as a crane as previously described. In this configuration, the side shifting systems may service a plurality of paths, such as 4 or more, and may not need to convey containers along the paths. The conveyor paths move containers on one of the levels 204 between additional WCE's 200 situated at increments within the facility 20. If desired, the conveyors in each adjacent aisle may run in opposing directions as described below, to move containers 14 to one or the other sides of facility 20.

As seen in FIG. 16, the bottom floor of the facility 20 is preferably left open for loading of containers on vehicles from the levels 204. The WCE's 200 a are preferably designed to travel at a rapid rate of speed, such as from 0 to 12 feet per second, and may include the anti-topple system or be top driven as in prior examples. That means that in a 180 foot tall structure, the elevators 200 can load a container handed off to the elevator 200 by a conveyor, transfer shuttle as described in prior examples, or other suitable system, in about 20 seconds. That equates to an average cycle time in the facility in the up or down movement of ten seconds. These elevators 200 are interfaced through the control system 50 to assure that each container is located in the correct spot and for loading containers onto the correct rail car or truck for ultimate delivery to the owner of the freight. The levels 204 forming the main storage area for containers 14 may be configured to hold as many containers as needed. An individual level 204 or portion thereof may be used to separate and/or store containers 14. For example, an operator could store all refrigerated containers for monitoring of their refrigeration units, or for the storage of bulk containers such as those used to transport loose nickel pellets for use in foundries and steel mills, or to sort containers by their shipping point such at retail stores, hazardous cargo may have its own storage area as designated by insurance and Customs rules or the like. The containers can be stored within a level 204 for being shipped out on a new outbound ship so that loading of that ship can occur rapidly and accurately.

In this example, the facility 20 also provides for simultaneous ground level loading and unloading of containers. The ground level loading and unloading can occur under the levels 204 of the facility 20 and/or at the staging areas at each end. These operations are achieved by the control system 50 controlling all of the equipment by sequencing, tracking and moving containers using the above components of the facility. Local trucks/rail and personnel are controlled to enter the Port itself by GPS or other suitable control and into the load area of the facility 20 on the ground level 206 using a number of pick up load lanes under the levels 204 above the ground floor and at the location of a WCE 200. Alternatively, the containers may be transported to the other end of the facility 20 and moved to the staging area for loading by a further transfer system, such as by another elevator 200. For example, a transfer system may be a WCE that can travel transversely along the side of the facility 20 and transfer containers 14 from the facility 20 to transport on the ground from any of the levels 42. In off-loading of containers 14, a truck/rail is guided by directions and sequence by Ghost GPS or other suitable system. The truck may use staging lights and GPS signal within the truck notifying the drivers when they are approaching or arrival to their load or unload spot. Optical Readers may be used to identify the containers unique serial number or other identification to assure the correct container is loaded onto the correct truck. If it is rail, the system works in the same fashion. The Ghost GPS will reduce traffic snarls near the Port by controlling port traffic. This will also significantly reduce carbon emissions and fuel consumption. To further reduce fuel consumption, the systems of the invention may be all electric, and the arrangement eliminates the use of trucks, fork lifts, wheeled cranes and other container management vehicles currently used.

Figure 18:
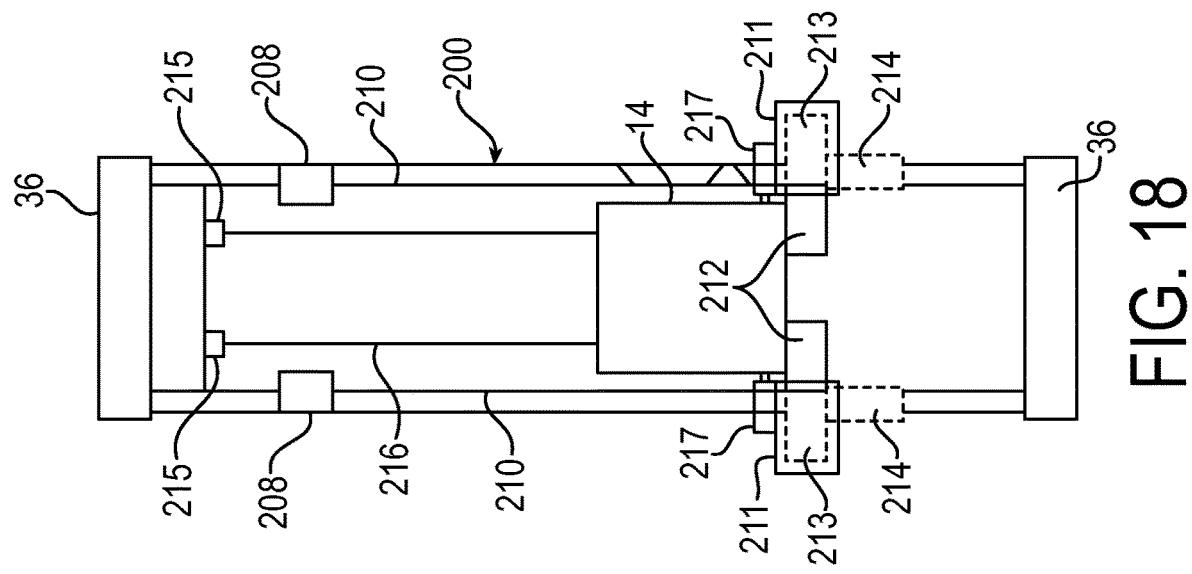
FIG. 18 is a partial schematic end view of the WCE shown in FIG. 17.
Figure 17:
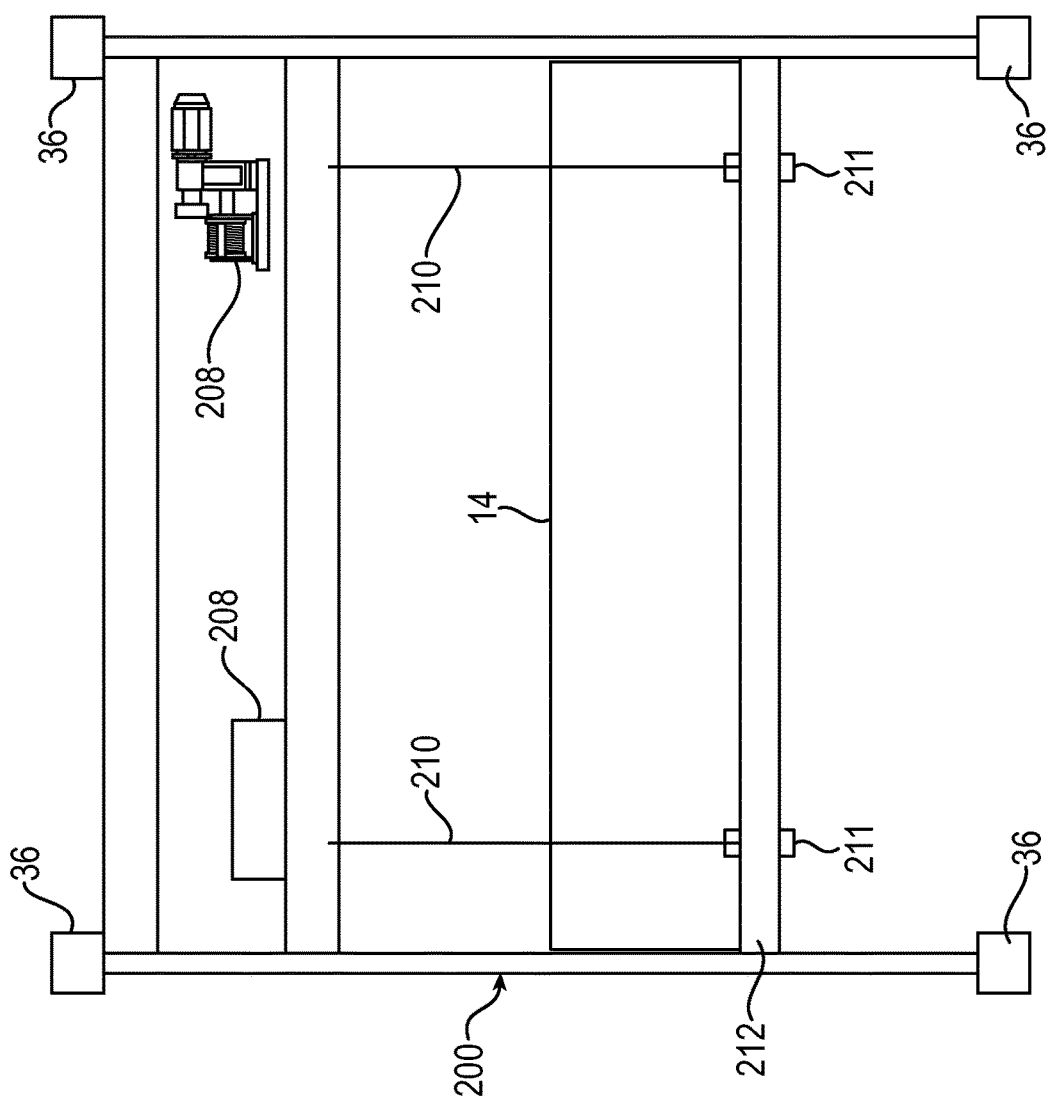
FIG. 17 is a partial schematic side view of a WCE for transfer to transshipment vehicles according to an example.

The movement of containers 14 from the levels 204 is facilitated by a transfer system 200, to be repositioned on a transport such as a truck, rail or the like as described above. The transfer system may be a WCE 200 as shown in FIGS. 17 and 18, may include one or more lift systems 208, such as a hoist system using a series of hoist cables 210 in association with supports 212. Other suitable systems are contemplated, such as gear drives, chain hoist, crane system or the like. The containers 14 are moved from a floor 204 onto the supports 212 of the WCE 200 by a conveyor, transfer shuttle or the like as previously described. The supports 212 are provided in cassette housings 211, to which cables 210 are attached to raise and lower container supports 212. Once positioned on the lift system, the elevator 200 can then move the container 14 to or from any floor including the ground floor of the facility 20. The elevators 200 may be driven by powered or driven wheeled end trucks 36 or the like, positioned at least at the bottom thereof. In the example shown, there are also top end trucks 36, with driven or undriven wheels or the like. Driven end trucks 36 may be provided at the top of the system, to add drive power and speed to the system, while the end trucks 36 in general avoid instability. To facilitate efficient transfer to trucks, rail or other such vehicles, the elevators 200 in this example may allow the container 14 to be directly lowered to a designated transfer system such as a truck, rail or other vehicle via the lift system 208 and cables 210 attached to the cassette housings 211. The elevators 200 may include supports 212 that are movably mounted in the cassette frames 211, and are movable from a support position as shown, to an unload position at 213 or 214 (see FIG. 18). Upon moving to position 213 or 214, the support 212 is now in a retracted position where container 14 can move through elevator 200 to allow the container 14 to be directly lowered to a designated vehicle by lift(s) 208. In load position 213, the support 212 is indexed sideways relative to the cassette frame 211 to a position inboard of the container 14, while load position 214 shows the support 212 is indexed downwardly (or upwardly) to a position inboard of the container 14, thereby allowing container 14 to be lowered to a transshipment system on the ground or other floors for loading/unloading by lift 208. In this example, to allow retraction of the supports 212, there may be provided at least one lift system 217 positioned relative to container 14 to engage and support container 14 without supports 212 in the support position. The lift system 212 in this example may be a pin lift system, that includes a pin that extends into an opening on the side of container 14 (such openings for use of grapples or the like), and lifts the container 14 a slight amount. The lift pin systems may be provided at each corner of the container 14 in association with cassette housings 211 and supports 212. A plurality of lift systems 217 may be provided for the standard container sizes, or the systems 217 may be slidable or moveable the desired position. Once supports 212 are retracted, the container can be lowered to the ground level and then be moved through the created opening in elevator 200 onto a transshipment vehicle or the like. Alternatively, the elevator 200 may include another lift system 215 and cables 216 or the like, connected directly to the container 14, to allow it to be lowered through the created opening in elevator 200 onto a transshipment vehicle or the like when the supports 212 are retracted.

Using these components, the facility 20 may also allow for simultaneous ground level loading for trucks, rail, AGV's or other like transport systems. In this example, the bottom floor of the facility is open, and the WCE's 200 are situated internally to the facility 20 to allow access to containers 14 at multiple locations on the bottom floor. The elevators 200 will allow a container 14 to be off loaded from a floor of the facility 20 and dropped immediately down to the ground floor and to an awaiting truck, rail system or the like, for further transshipment or the like. The control system 50 and operating software performs the complete management of all container movements, sorting requirements, memory/logging of shipments, sequencing of containers for land transfer, outgoing containers, transshipments, and all other functions.

In this example, each floor of facility 20 may also be provided with conveyors on each floor that form "carousel bays", with a plurality of such bays formed as a number of independently controlled units adjacent one another on each floor 204. Each carousel bay comprises first and second elongated conveyor paths, to allow the containers 14 to be independently moved for storing and staging. The containers 14 are not stacked upon one another, but are arranged end to end on the elongated conveyor paths. The containers 14 are moved back and forth along one of the first or second elongated paths, and may be side shifted via systems 114 such as previously described, to another path if needed. In an example, side shifting is performed at each end of the facility 20, and cranes 120 may be configured to move containers 14 only between paths and not along them. If desired, the facility 20 may be configured with open paths or aisles for side shift movement of a container and/or to serve as a travel aisle to move a particular container 14 to be off-loaded from the facility 20. The rotational type movement between each of the elongated paths allows any container 14 to be accessed quickly. This is possible because the containers 14 are not stacked one upon one another. The containers 14 on the paths of carousel bays may be moved in a clockwise or counterclockwise direction. The side shifting operation allows an operator to create a constant circular flow motion within each of the carousel bays, to access any container 14 in any carousel bay quickly.

The examples are described with reference to a particular system according to the invention, but different embodiments for different applications and/or environments are contemplated. Obviously, modifications and alterations within the scope of the invention will occur to others upon reading and understanding the preceding description. It is intended that the invention be construed as including all such modifications and alterations insofar as they come within the scope of the appended claims or the equivalents thereof

What is claimed is:

1. A system for handling shipping containers comprising, a facility having a length and a width, and a plurality of aisles having a plurality of storage areas at different levels on either side of the aisle, the plurality of storage areas having a length for positioning multiple containers, with at least some storage areas configured to accommodate first sized containers and at least some storage areas configured to accommodate at least second different sized containers, at least one wheeled container elevator system (WCE) provided in each of the plurality of aisles, and a shuttle system for supporting a container and being controlled to move a container to and from a WCE and one of the storage areas on one of the plurality of levels at a predetermined position along the length of the storage area, each of the shuttle systems configured to move the first size and at least one second different sized containers, and a control system to operate the WCE's and shuttle systems to receive a container coming into the facility via a container transport system or transfer a container exiting the facility via a container transport system and transfer the container to or retrieve the container from the predetermined position in a storage area, wherein a WCE is positioned on either side of the length of the storage areas to allow containers to be loaded or unloaded from the predetermined position from both sides of the storage area.

2. The system of claim 1, wherein there is at least one container transfer system adjacent the facility onto which containers are positioned for movement into or out of the facility, wherein the at least one container transfer system is mounted on one or more traveling bases to allow movement relative to the facility.

3. A system for handling shipping containers comprising, a facility having a length and a width, and a plurality of aisles having a plurality of storage areas at different levels on either side of the aisle, the plurality of storage areas having a length for positioning multiple containers, with at least some storage areas configured to accommodate first sized containers and at least some storage areas configured to accommodate at least second different sized containers, at least one wheeled container elevator system (WCE) provided in each of the plurality of aisles, and a shuttle system for supporting a container and being controlled to move a container to and from a WCE and one of the storage areas on one of the plurality of levels at a predetermined position along the length of the storage area, each of the shuttle systems configured to move the first size and at least one second different sized containers, and a control system to operate the WCE's and shuttle systems to receive a container coming into the facility via a container transport system or transfer a container exiting the facility via a container transport system and transfer the container to or retrieve the container from the predetermined position in a storage area, wherein multiple WCE are provided in each aisle to move containers onto or from a level.

4. The system of claim 1, wherein the facility has loading aisles positioned at least at first and second sides of the facility with at least one WCE provided in the loading aisles used to load and unload container transport vehicles on the ground level of the facility in the aisle, where the WCE places a container on or retrieves a container from the transport vehicle in the loading aisle.

5. The system of claim 1, further comprising a plurality of shuttle systems to move the containers from and to a WCE.

6. The system of claim 1, wherein some WCE's are configured to service predetermined levels of the storage areas and other WCE's are configured to service other predetermined levels of the storage areas.

7. The system of claim 1, wherein the WCE's include one or more systems for grasping or lifting of containers.

8. The system of claim 1, wherein the WCE's include a drive system on the ground level and a top running anti-toppling system.

9. The system of claim 8, wherein the top running anti-toppling systems include drive systems.

10. The system of claim 1, further comprising at least one container off-loading system for off-loading containers from a transshipment vehicle and a movable container receiving transfer system that is positionable at a predetermined position under the at least one container off-loading system.

11. The system of claim 1, wherein the WCE's are also movable along the direction transverse to the aisles.

12. The system of claim 1, wherein the container is supported on the shuttle system which includes a lift mechanism and drive members which engage rails or other support members.

13. The system of claim 3, wherein the facility has loading aisles positioned at least at first and second sides of the facility with at least one WCE provided in the loading aisles used to load and unload container transport vehicles on the ground level of the facility in the aisle, where the WCE places a container on or retrieves a container from the transport vehicle in the loading aisle.

14. The system of claim 3, further comprising at least one container off-loading system for off-loading containers from a transshipment vehicle and a movable container receiving transfer system that is positionable at a predetermined position under the at least one container off-loading system.

15. The system of claim 1, wherein multiple WCE are provided in each aisle to move containers onto or from a level.

16. The system of claim 3, wherein a WCE is positioned on either side of the length of the storage areas to allow containers to be loaded or unloaded from the predetermined position from both sides of the storage area.

17. The system of claim 1, further comprising a non-invasive inspection system through which all containers are passed prior to entry into the facility.

18. The system of claim 1, wherein the ground floor of the facility is open for movement of transshipment vehicles.

19. A method of handling shipping containers to transfer such containers between transshipment systems, comprising off-loading a plurality of shipping containers from a first transshipment system and moving the off-loaded containers to a predetermined storage position in a facility with a plurality of container storage areas configured for multiple containers formed on either side of aisles in the facility with at least one wheeled container elevator (WCE) configured to move in each aisle, a shuttle system configured to support and move a first sized and at least one second different sized container to and from the WCE and to and from a predetermined position in a storage area in relation to any other containers in the storage area including shifting of the position of other containers in the storage area if needed to position a particular container at a desired position in a storage area along the length of the storage area, and moving the containers to at least one second transshipment system.

20. The method of claim 19, further comprising a platform elevated above the ground level onto which the container is off-loaded from the first transshipment system having a non-invasive inspection system through which all containers are passed prior to entry into the facility positioned on the elevated platform.

21. The method of claim 19, wherein the ground floor of the facility is open for movement of transshipment vehicles under the levels of the facility.

* * * * *